Aug. 4, 1964 D. J. SMITHSON 3,143,667
MONOSTABLE TRIGGER ARRANGEMENTS
Filed May 28, 1962
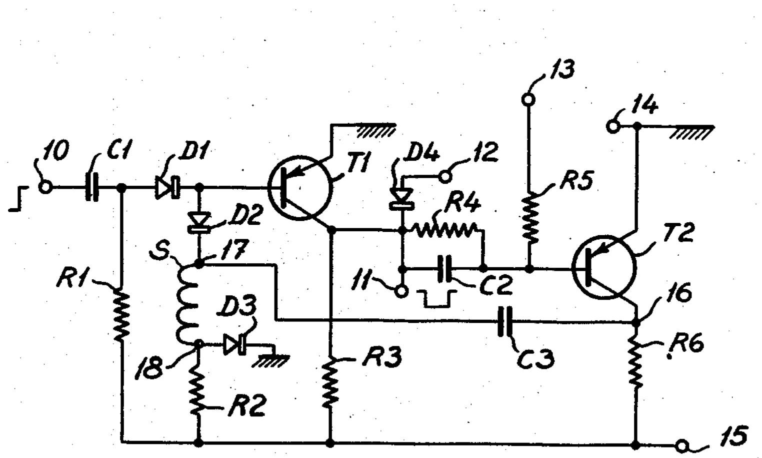

United States Patent Office 3,143,667

Patented Aug. 4, 1964

3,143,667

MONOSTABLE TRIGGER ARRANGEMENTS

David John Smithson, St. Germain, France, assignor to Compagnie des Machines Bull (Société Anonyme), Paris, France Filed May 28, 1962, Ser. No. 197,982
Claims priority, application France June 16, 1961
6 Claims. (Cl. 307—88.5)

This invention relates to trigger circuits which have only one stable state and which may be regarded either as pulse generators or as devices producing a predetermined time delays, depending upon the purpose for which they are employed.

In the majority of present applications, it is necessary for the duration of the quasi-stable state of such a monostable arrangement or circuit to be defined by very narrow tolerances. Also, this duration, or time delay, must be as independent as possible of the variations in the supply voltages of the device.

The monostable circuit according to the invention meets these requirements and in addition affords other advantages over hitherto known arrangements. The present circuit is capable of providing considerable power gain and of supplying steep-fronted pulses to capacitive loads.

In many known monostable devices comprising essentially two transistors, the duration of the output pulse is generally fixed by a resistance-capacitance network. Since this duration is a function of the product R-C and of the supply voltages, the tolerances on the components and the variations of the said voltages are contrary to a good definition of the duration of the output pulse.

In accordance with the invention, the time-constant network consists of an inductor (or self-inductance) and a capacitor connected in series. These elements are so arranged that the duration of the output pulse is directly proportional to their oscillation period, which, as is known, is equal to $2\pi\sqrt{LC}$. Only one-quarter of the complete cycle of the voltage oscillation is in fact utilised, and finally the duration of the output pulse is slightly greater than $\pi\sqrt{LC}/2$.

It will be apperciated that the duration of the output pulse no longer depends upon the supply voltages at all. Although in practice manufacturing tolerances exist in the inductive or capacitive elements, it will be seen that they now affect the duration in question only by the square root of their product.

In the monostable trigger arrangement according to the invention, one plate of the capacitor is connected to the collector of that one of the transistors which is normally non-conductive or blocked. The junction point of the capacitor and of the inductor is connected more or less directly to the base of the other transistor, which conducts when the device is in the stable state. Finally, the foot or "cold point" of the inductor is connected by a crystal diode to one terminal of a potential source, to which the emitter of the normally conducting transistor is also connected.

Monostable devices having pulse durations ranging between 0.2 microsecond and several microseconds may advantageously be constructed in series simply by changing the inductor and the capacitor of the time-constant network, all the other components remaining identical.

For a better understanding of the invention and to show how it may be carried into effect, an embodiment thereof will now be described, by way of example, with reference to the single figure of the accompanying drawing.

In this figure there is shown a circuit arrangement including a first transistor T1 whose base can receive an input pulse applied to an input terminal 10 and transmitted through a capacitor C1 and a diode D1. Resistances R3 and R6 are the collector load resistances for transistors T1 and T2 respectively. As in known monostable devices, an R-C network (resistor R4 and capacitor C2) is connected between the collector of the transistor T1 and the base of the second transistor T2. The resistances R3, R4, R5 are such that in the stable or quiescent state the base of the transistor T2 is positive in relation to the emitter, so that T2 is non-conductive.

A square-wave output pulse is available at the output terminal 11, which is connected to the collector of the first transistor T1. The diode D4 whose anode is connected to a negative potential terminal 12, determines the lower voltage level of each output pulse.

An oscillation circuit for determining the duration of the quasi-stable state comprises a capacitor C3 and an inductor S, which are connected in series. When the device is in the quiescent state, there exists a continuous path for the base current of the transistor T1. This path comprises, starting from the base of T1, the diode D2, the winding of the inductor S and the resistance R2 having one end connected to a terminal 15 which is connected to a bias voltage source. The junction between the inductor S and the resistance R2 is connected to ground, or zero potential, through a diode D3.

By way of non-limiting example, the values of some elements are given in order to clarify the explanations relating to the operation:

| | |
|---|---|
| R2=10 kilohms | R4=4.7 kilohms |
| R3=1.2 kilohms | R5=18 kilohms |

Supply voltages across the terminals:

| | |
|---|---|
| **12**=−3 volts | **14**=0 volt (earth) |
| **13**=+5 volts | **15**=−8 volts |

Preferably, the diode D3 is a crystal diode having low hole storage and a forward resistance of medium value. For example, with a diode of the type OA90, a current of 10 ma. flowing through it in the forward direction produces across its terminals a potential difference of the order of 1.2 volts. The other crystal diodes may be of a type having a lower forward resistance. The intrinsic rapidity of the monostable device may be retained by employing for T1 and T2 MADT transistors of medium power.

When it is desired to obtain different pulse durations, the LC product is modified by adopting a different inductor S and/or a different capacitor C3. However, it is desirable to retain a substantially constant impedance for the oscillation circuit. For example, for a pulse duration of 1 microsecond, an inductance of 520 microhenrys and a capacitance of 680 picofarads correspond to an impedance of 875 ohms.

When the trigger circuit is in the quiescent or stable state, the transistor T1 conducts, and is even highly saturated, since a relatively strong base current can flow through the diode D2, the inductor S and the resistance R2 to the terminal 15. The diodes D1, D3 and D4 are cut off because they are biased in the inverse direction, i.e., back biased.

Since the transistor T2 is non-conductive, the voltage at the point 16 is approximately −8 volts, and if the voltage drops across the emitter-base junction of T1 and across the diode D2 are neglected, it is found that the capacitor C3 is charged at a voltage of about 8 volts.

When a steep-flanked i.e. fast rise time pulse is applied to the input 10, only the positive going edge gives rise to a positive pulse differentiated by capacitor C1 and resistor R1 and transmitted via diode D1 to the base of transistor T1. The conductive state of the latter is interrupted, giving rise to negative going leading edge of the output pulse at the terminal 11. This sudden voltage change is instantaneously transmitted by the capacitor C2 to the base of the transistor T2, which therefore starts conducting.

The sudden flow of the collector current through the resistance R6 produces a voltage step of about 8 volts at its terminals. This positive going voltage step is instantaneously transmitted through capacitor C3 to the junction 17 where it is balanced by the counter-electromotive force developed by inductor S. This effect results in blocking of the diodes D2 and D1. An oscillating discharge cycle of the capacitor C3 then commences. From this instant, the discharge current flowing through the inductor S increases sinusoidally. It is first substituted for the base current which was previously flowing through resistor R2, and then, when the voltage at the point 18 becomes positive, the diode D3 conducts and provides therefor a low-resistance path. It will be noted because of the diode D2 the oscillation circuit is well insulated from the other elements during this phase.

As the discharge current increases through the inductor S, the voltage at the junction point 17 decreases cosinusoidally. Since the greater part of this discharge current flows through the diode D3, the voltage at the point 18 rises progressively so as to reach about +1 volt.

There arrives an instant when the voltage across the terminals of the inductor S is cancelled out and when the discharge current passes through its maximum value, i.e. after a time equal to $\pi\sqrt{LC}/2+\epsilon$, $\epsilon$ being a time for the transients from the beginning of the cycle of operation. The voltage at the point 17 is therefore +1 volt and it may be seen that the diode D2 and the base-emitter junction of T1 are therefore biased in the direction of high inverse voltage, and T1 remains blocked.

From this instant, the voltage across the terminals of the inductor S reverses, but the discharge current commences to decrease. The voltage at the point 17 becomes negative in relation to that at the point 18 and increases in absolute value in a substantially linear manner. At the instant when this potential difference reaches approximately 1 volt, the voltage at the point 17 passes through the zero volt level and as soon as it becomes negative the diode D2 tends to conduct, thus bringing about conduction in the emitter-base junction of the transistor T1.

From this instant, the base current of transistor T1 can increase rapidly due to the current induced by the decreasing voltage set up at the junction 17 under the action of the inductors S. The transistor T1 is brought back to the conductive state, whereby the regenerative effect is produced, in the course of which the change of voltage in a positive direction set up across the terminals of the resistance R3 is instantaneously transmitted to the base of the transistor T2, which is thus rapidly blocked.

The voltage step set up across the terminals of the resistance R3 constitutes the trailing edge of the output pulse, which takes place, in the example under consideration, with a delay of 1 microsecond in relation to the instant of application of the positive step to the input of the device.

The recharging of the capacitor C3 continues while the voltage across the terminals of the inductor S is limited to a constant value for a certain period of time. The voltage at the point 17 becomes stabilised at a value of about −0.4 volt, while the voltage at the point 18 decreases only slowly from the maximum voltage of +1 volt. During this period of time, the voltage at the point 16 decreases exponentially and at the end of the recharging operation the voltage across the terminals of the inductor S decreases and is finally cancelled out, and the stable state of the device is then completely restored.

It is to be noted that when the voltage across the terminals of the inductor S is cancelled out, the tangent to the curve of the voltage at the point 17 with respect to time has a slope equal to $\pi/2$. This constitutes a much better factor for the definition of the delay time than when this time is defined by an R-C network, in which case this slope is equal only to 1 under similar conditions.

On the other hand, in the device according to the invention, the duration of the pulse is also, to some extent, independent of the variations in the characteristics of the transistors, provided that the maximum current flowing through the oscillation circuit is greater than the collector current of either of the two transistors. Finally, the monostable device is capable of supplying an output pulse with a very steep edge, because at the instant when the first transistor is to become conductive again the energy stored in the inductor during the quasi-stable state causes a high base current to be set up.

In some cases, it may be desirable to shunt the diode D3 with a resistance of lower value than the resistance R2, in order to prevent the inductor S from entering into oscillation with its distributed capacitance.

It is obvious that further modifications could be made to the described device, notably for the purpose of employing NPN transistors instead of PNP transistors, without departing from the scope of the invention.

I claim:

1. In a transistor monostable trigger circuit comprising a first and a second transistor, each having base, emitter and collector electrodes, voltage source means and resistors coupled to electrodes for maintaining said first transistor conducting and said second transistor non-conducting in the stable state of the circuit, resistor-capacitor coupling means connected between the collector of said first transistor and the base of said second transistor, and input means connected to apply a trigger pulse to the base of said first transistor, the combination of a series-resonant circuit including an inductor and a capacitor series-connected, one plate of said capacitor being connected to the collector of said second transistor, the junction point of said capacitor and inductor being connected through a first unidirectionally conducting device to the base of said first transistor, and the other end of said inductor being connected through a second unidirectionally conducting device to the emitter of said first transistor, the inductance and capacitance in said resonant circuit having values such that the duration of an output pulse substantially equals a quarter of the oscillating period of said resonant circuit.

2. A monostable circuit as claimed in claim 1, including a resistor series-connected with said other end of said inductor, said first unidirectionally conducting device being a crystal diode poled to let the base current flow through a base current circuit branch including also said inductor and resistor, during the stable state assumed by the arrangement.

3. A monostable arrangement as claimed in claim 2, in which said second unidirectionally conducting device is a crystal diode poled to conduct the discharge current from said capacitor when the circuit is triggered into its quasi-stable state by the application of said trigger pulse.

4. A monostable trigger circuit for developing an output pulse of a predetermined width comprising a first and a second transistor, each of said transistors including emitter, base and collector electrodes, input signal means coupled to the base and emitter of said first transistor for applying an input signal thereto, voltage source means and resistors connected to said transistor electrodes to establish a stable state of the circuit wherein only said first transistor conducts, a resistor-capacitor coupling means for connecting the collector of said first transistor to the base of said second transistor, and a series-resonant inductor-capacitor circuit in which one plate of the capacitor is connected to the collector of said second transistor, the junction point of the inductor winding and of the capacitor is galvanically coupled to the base of said first transistor and the other end of the inductor winding is galvanically coupled to the emitter of said first transistor.

5. The monostable circuit as set forth in claim 4, wherein the galvanic coupling of said junction point to the base of said first transistor is by a crystal diode poled to convey forward current in the same sense as the emitter-base junction of said first transistor.

6. The monostable circuit according to claim 5 including a source of fixed potential, and a resistor connected between said other end of said inductor winding and said source, and the galvanic coupling of said other end of the inductor winding to said emitter being made by a crystal diode poled to convey the discharge current of said capacitor through said inductor.

References Cited in the file of this patent

UNITED STATES PATENTS

| | | |
|---|---|---|
| 2,470,028 | Gordon | May 10, 1949 |
| 2,659,816 | Fleming-Williams et al. | Nov. 17, 1953 |
| 2,764,643 | Sulzer | Sept. 25, 1956 |